United States Patent [19]
Sakakiyama

[11] Patent Number: 4,657,123
[45] Date of Patent: Apr. 14, 1987

[54] SYSTEM FOR ENGAGING AN ELECTROMAGNETIC CLUTCH DURING RANGE CHANGE OPERATION

[75] Inventor: Ryuzo Sakakiyama, Tokyo, Japan

[73] Assignee: Fuji Jukogyo Kabushiki Kaisha, Tokyo, Japan

[21] Appl. No.: 693,712

[22] Filed: Jan. 23, 1985

[30] Foreign Application Priority Data

Jan. 31, 1984 [JP] Japan ................... 59-15418

[51] Int. Cl.⁴ ............................................. B60K 41/22
[52] U.S. Cl. ................... 192/3.58; 192/0.052; 192/3.54; 192/3.62
[58] Field of Search ............ 192/0.052, 0.07, 0.075, 192/0.092, 0.076, 0.096, 3.54, 3.55, 3.56, 3.61, 3.62, 3.58, 21.5, 103 R

[56] References Cited

U.S. PATENT DOCUMENTS 4,403,683 9/1983 Takano ..................... 192/0.052
4,416,360 11/1983 Fiala ........................ 192/0.076
4,457,410 7/1984 Suga et al. ................ 192/0.052
4,461,374 7/1984 Umezawa ................... 192/21.5

FOREIGN PATENT DOCUMENTS 58-68538 4/1983 Japan ........................ 192/3.56

Primary Examiner—Leslie Braun
Assistant Examiner—Dwight G. Diehl
Attorney, Agent, or Firm—Martin A. Farber

[57] ABSTRACT

A system for controlling the clutch current of an electromagnetic clutch for a vehicle which has an automatic transmission and a select lever for selecting driving ranges in the transmission. A driving range switch is provided to be operated when the select lever is operated to select a driving range. A logic gate circuit is provided to respond to a signal of the select lever switch for allowing the clutch current to flow. A delay circuit responds to the signal of the driving range switch for producing an output with a delay and for opening the logic gate circuit, whereby the clutch is engaged for a predetermined period after the operation of the select lever.

13 Claims, 4 Drawing Figures

SYSTEM FOR ENGAGING AN ELECTROMAGNETIC CLUTCH DURING RANGE CHANGE OPERATION

BACKGROUND OF THE INVENTION

The present invention relates to a system for controlling the clutch current of an electromagnetic clutch disposed between a crankshaft of an engine and an infinitely variable transmission of a motor vehicle.

In order to start the vehicle, the control system for the electromagnetic clutch is adapted to increase clutch current flowing in a coil of the electromagnetic clutch with respect to an increase of the engine speed. When vehicle speed exceeds a predetermined speed (for example 20 km/h), a lock-up current flows through the coil, so that the clutch is entirely engaged.

A power transmission system comprising the electromagnetic clutch and an infinitely variable belt-drive automatic transmission has been proposed. In the automatic transmission, various operating ranges such as D (driving)-range, Ds-range, N(neutral)-range, R(reverse)-range and P(parking)-range are provided and the selection of the range is done by a select lever. In the Ds-range, the transmission ratio is varied in a high engine speed range in order to provide powerful driving of the vehicle. Accordingly, select lever operation for the change from the D-range to the Ds-range or vice versa is often performed while driving. On the other hand, for the selection of the ranges, a D-range switch and a Ds-range switch are provided to be operated by the select lever. However, there is a dead range where no signal occurs between operation of the D-range switch and operation of the Ds-range switch during the operation of the select lever. Because of the dead range, the clutch current is cut off to disengage the automatic transmission from the engine, which means a cutting off of the power transmission while driving.

SUMMARY OF THE INVENTION

The object of the present invention is to provide a control system for an electromagnetic clutch which eliminates the above-described defect in an automatic transmission, namely that the power transmission is cut off during the selection operation of driving ranges.

In accordance with the present invention, the electromagnetic clutch is kepttp in engagement during the selection operation by delaying a signal of a range switch.

According to the present invention, there is provided a system for controlling the clutch current of an electromagnetic clutch for a vehicle having an automatic transmission and a select lever for selecting driving ranges in the automatic transmission including a first and second driving range which are different in transmission performance. When the select lever is moved out of first or second driving ranges a circuit provides a signal to provide the clutch current so as to keep the clutch in engagement for a delay time.

The other objects and features of this invention will become understood from the following description with reference to the accompanying drawings.

DETAILED DESCRIPTION OF THE PREFERRED EMBODIMENT

Figure 1A:
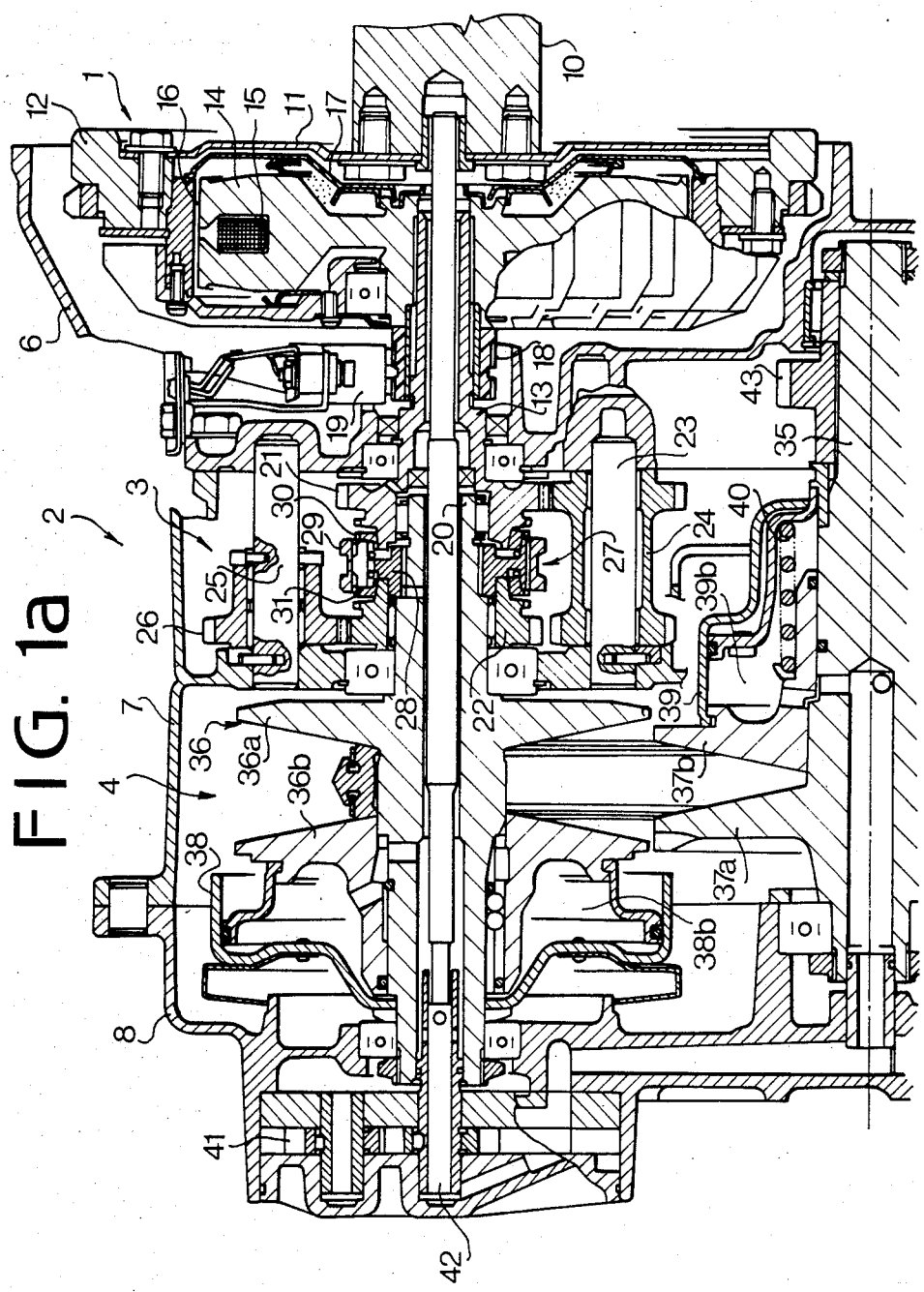
FIGS. 1a and 1b are sectional views showing an infinitely variable belt-drive transmission with an electromagnetic clutch to which the present invention is applied.
Figure 1B:
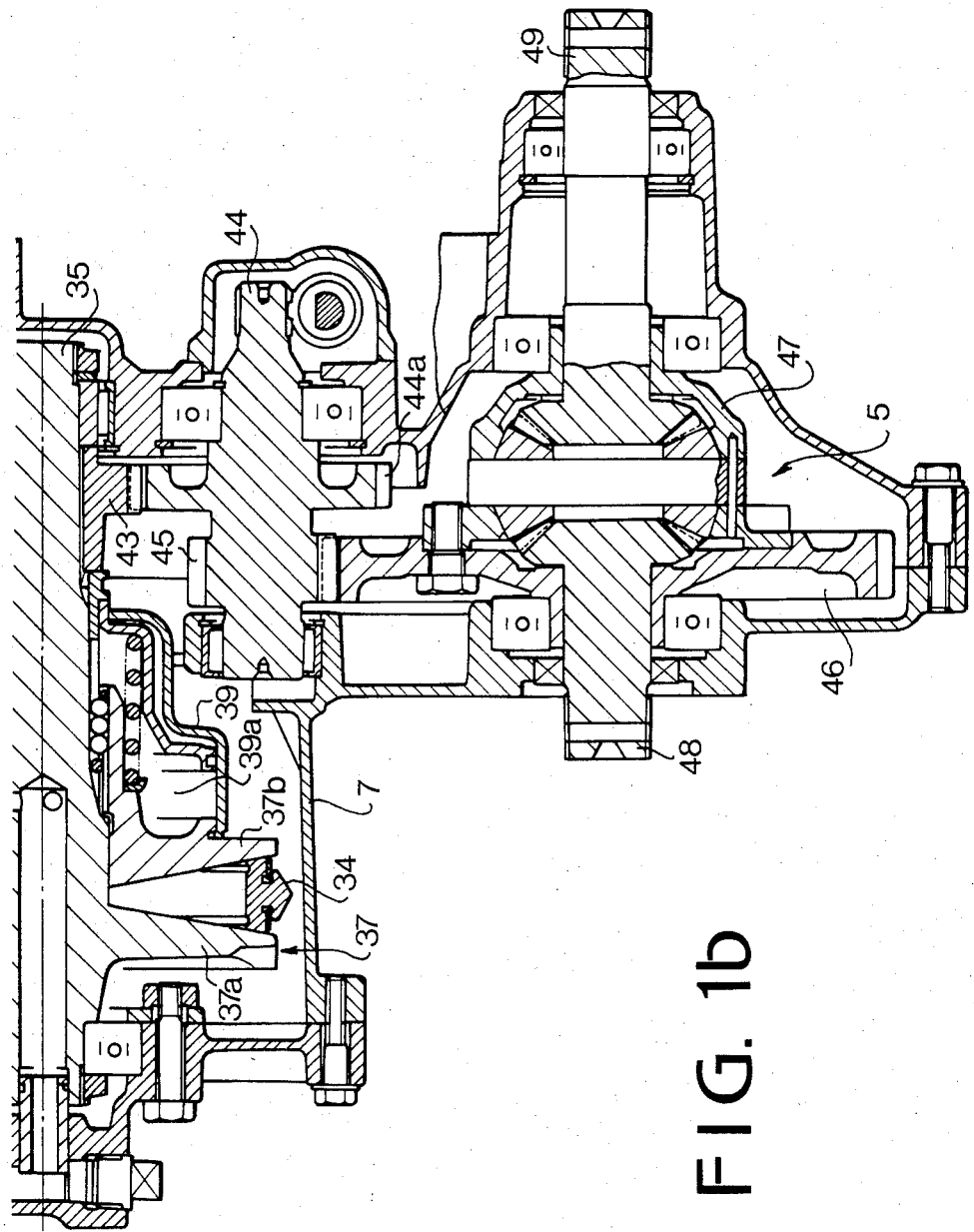

Referring to FIGS. 1a and 1b, an infinitely variable belt-drive automatic transmission for a vehicle, to which the present invention is applied, comprises an electromagnetic powder clutch 1, an infinitely variable belt-drive transmission 2, a selector device 3, pulleys and belt device 4, final reduction device 5, and a pressure oil control circuit (not shown). The electromagnetic powder clutch 1 is provided in a housing 6, and the selector device 3, pulleys and belt device 4 and final reduction device 5 are provided in a main housing 7 and a side housing 8. A crankshaft 10 of an engine (not shown) is connected to an annular drive member 12 through a drive plate 11 of the electromagnetic powder clutch 1. The electromagentic powder clutch comprises a driven member 14 and a magnetizing coil 15 provided in the driven member 14. The driven member 14 has its outer periphery spaced from the inner periphery of the drive member 12 by a gap 16, and a powder chamber 17 is defined between the drive member 12 and driven member 14. The powder chamber 17 is provided with magnetic powder material. The driven member 14 is secured to an input shaft 13 of the belt-drive transmission. A holder secured to the driven member 14 carries slip rings 18 which are electrically connected to the coil 15. The coil 15 is supplied through brushes 19 and the slip rings 18 with current from a control circuit for the electromagnetic powder clutch.

When the magnetizing coil 15 is excited by the clutch current, the driven member 14 is magnetized to produce a magnetic flux passing through the drive member 12. The magnetic powder is aggregated in the gap 16 by the magnetic flux and the driven member 14 is engaged with the drive member 12 by the powder. On the other hand, when the clutch current is cut off, the drive and driven members 12 and 14 are disengaged from one another.

In the belt-drive transmission 2, the selector device 3 is provided between the input shaft 13 and a main shaft 20. The main shaft 20 is cylindrical and is disposed coaxially with the input shaft 13. The selector device 3 comprises a drive gear 21 integral with the input shaft 13, a reverse driven gear 22 rotatably mounted on the main shaft 20, and a synchronizer 27 mounted on the main shaft 20. The drive gear 21 meshes with one of counter gears 24 rotatably mounted on a shaft 23. Another gear of the counter gears 24 engages with an idler gear 26 rotatably mounted on a shaft 25, which in turn engages with the driven gear 22.

The synchronizer 27 comprises a hub 28 secured to the main shaft 20, a synchronizer sleeve 29 slidably engaged with the hub 28 with splines, and synchronizer rings 30 and 31. The synchronizer sleeve 29 is adapted to engage with splines of the drive gear 21 or with splines of the driven gear 22 through rings 30 or 31.

At a neutral position (N range) of a selector lever 60, the sleeve 29 does not engage either gear, so that the main shaft 20 is disconnected from the input shaft 13. When the sleeve 29 is engaged with the gear 21, the input shaft 13 is connected to the main shaft 20 through the gear 21 and synchronizer 27 to provide a driving position (D range).

When the sleeve 29 is engaged with the gear 22, the input shaft 13 is connected to the main shaft 20 through gears 21, 24, 26, 22 and the synchronizer 27 to provide a reverse driving position (R range).

The main shaft 20 has an axial passage in which an oil pump driving shaft 42 connected to the crankshaft 10 is mounted. An output shaft 35 is provided in parallel with the main shaft 20. A drive pulley 36 and a driven pulley 37 are mounted on the shafts 20 and 35. A fixed conical disc 36a of the drive pulley 36 is integral with the main shaft 20 and an axially movable conical disc 36b is axially slidably mounted on the main shaft 20. The movable conical disc 36b also slides in a cylinder secured to the main shaft 20 to form a servo device 38. A chamber of the servo device 38 communicates with an oil pump 41 through the pressure oil control circuit. The oil pump 41 is driven by the shaft 42.

A fixed conical disc 37a of the driven pulley 37 is formed on the output shaft 35 opposite the movable disc 36b and a movable conical disc 37b is slidably mounted on the shaft 35 opposite disc 36a. The movable conical disc 37b has a cylindrical portion in which a piston portion of the output shaft 35 is slidably engaged to form a servo device 39. A chamber of the servo device 39 is communicated with the oil pump 41 through the pressure oil control circuit. A spring 40 is provided to bias the movable conical disc 37b toward the fixed conical disc 37a. A drive belt 34 engages with the drive pulley 36 and the driven pulley 37.

Secured to the output shaft 35 is a drive gear 43 which engages with an intermediate reduction gear 44a on an intermediate shaft 44. An intermediate gear 45 on the shaft 44 engages with a final gear 46. Rotation of the final gear 46 is transmitted to axles 48 and 49 driving wheels of the vehicle through a differential 47.

The pressure oil control circuit is responsive to vehicle speed, engine speed and throttle valve position for controlling the oil from the oil pump 41 to the servo devices 38 and 39 thereby moving the discs 36b and 37. Thus, the transmission ratio is infinitely changed.

Figure 2:
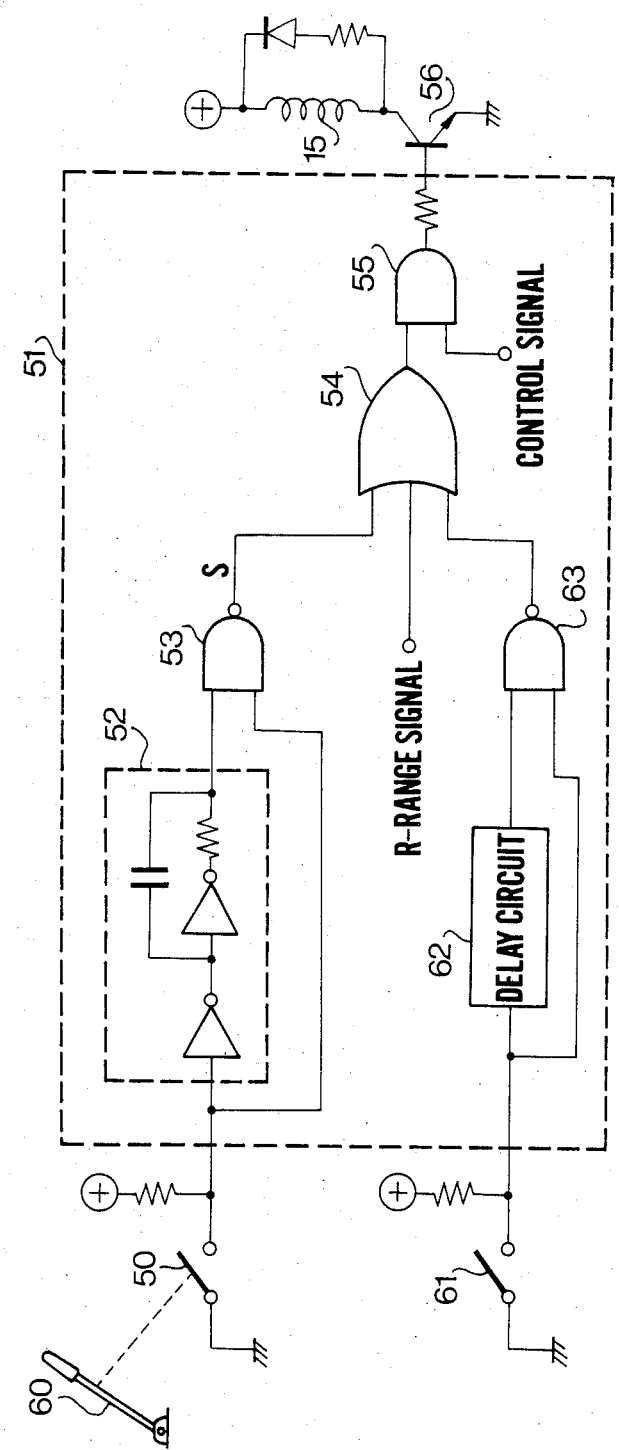
FIG. 2 is a schematic diagram showing a system of the present invention.

Referring to FIG. 2, the control system is provided with a Ds-range switch 50 and a D-range switch 61, each of which is closed to produce a low level signal when the respective range is selected by a select lever 60. The output of the Ds-range switch is applied to a NAND gate 53 directly and through a delay circuit 52. The delay circuit 52 is adapted to produce a high level output signal with a delay time T (FIG. 3(b)), when the Ds-range switch is opened, that is the output signal of the Ds-range switch changes from a low level to a high level. When the signal of the Ds-range switch changes from the high level to the low level, the circuit 52 produces a low level signal without delay. The output signal S of the NAND gate 53 is applied to a transistor 56 through an OR gate 54 and an AND gate 55. The OR gate 54 is applied with a D-range signal from a D-range switch and with an R-range signal from an R-range switch. The AND gate 55 is applied with a control signal for controlling the clutch current, for example at the start of the vehicle. The transistor 56 is connected in the circuit for the coil 13 of the electromagnetic clutch 1. The D-range switch 61 is also connected to the OR gate 54 through a delay circuit 62 and a NAND gate 63.

In operation, in the closed state of the Ds-range switch 50, which means the Ds-range driving of the vehicle, a low level singal is applied to the NAND gate 53 and also a low level signal is applied to the NAND gate from the delay circuit 52. Accordingly, the ouptut signal S of the NAND gate is at a high level, which is applied to the base of the transistor 56 through OR gate 54 and AND gate 55 to render the transistor conductive to engage the clutch 1.

Figure 3:
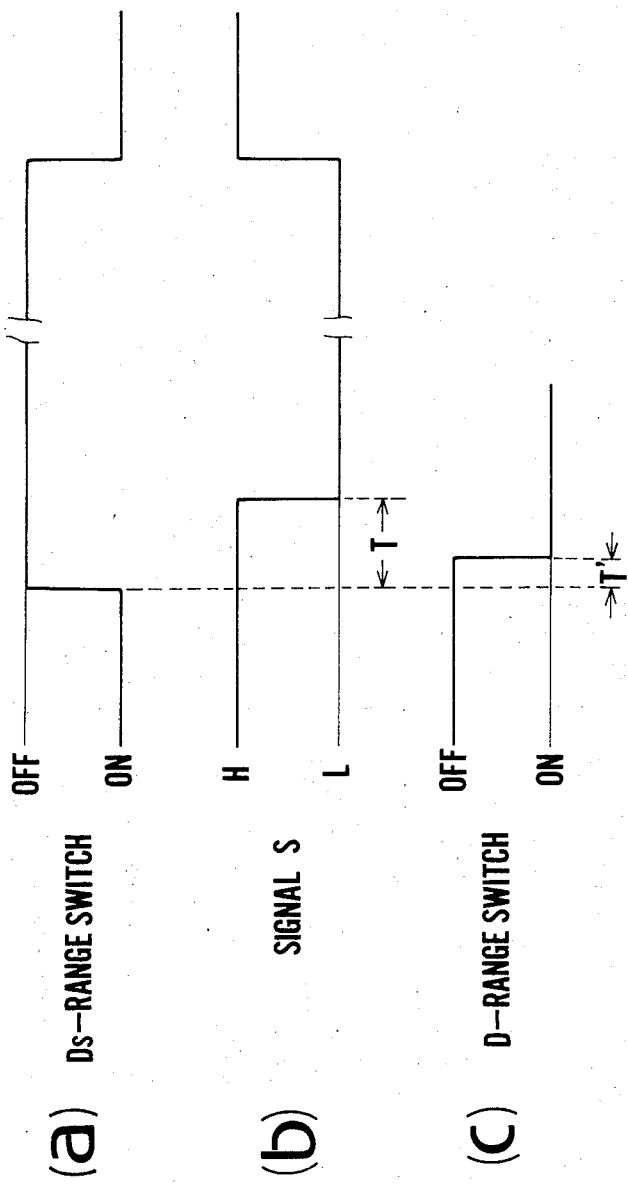
FIG. 3 is a graph showing the operation of the present system.

When another range such as the D-range is selected, the Ds-range switch 50 is opened, causing the output thereof to go to a high level as shown in FIG. 3(a). However, the delay circuit 52 does not produce an output signal at once, but produces it with a delay time T. Accordingly, the output signal S of the NAND gate 53 changes from the high level to the low level after the delay time T as shown in FIG. 3(b). Thus, the clutch 1 is kept in engagement during the time T after the opening of the Ds-range switch 50. Therefore, if the D-range switch 61 is closed with a manual shifting delay time T' after the opening of the Ds-range switch 50 as shown in FIG. 3(c), the clutch is not disengaged. When the N-range is selected, the clutch is disengaged after the delay time T, because no signal is applied to the transistor 56.

When the driving range is changed from the D-range to Ds range, the Ds-range switch 50 is closed and the D-range switch 61 is opened. Although the output signal S of the NAND gate 53 changes to a high level immediately upon the closing of the Ds-range switch 50, the NAND gate 63 produces an output signal with a delay time like T with the NAND gate 53. Accordingly, the clutch 1 is not disengaged between the time from opening the switch 61 (i.e. leaving the D range) until the switch 50 is closed (entering the Ds range).

It will be understood that the system of the present invention can also comprise a microcomputer system.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A system for controlling clutch current of an electromagnetic clutch which current produces engagement of the electromagnetic clutch in a vehicle having an engine, an automatic transmission with the clutch being connected between the engine and the automatic transmission, and a select layer selectively moveable to respective positions corresponding to first and second driving ranges of the automatic transmission which ranges are different in transmission performance and in which ranges the clutch current engages the clutch, comprising:

a first driving range switch and a second driving range switch respectively operated at the respective positions of the select lever producing first and second signals respectively;

delay means responsive, during operation of the select lever, to termination of the first and second signals immediately producing respecitively a third signal terminating with delay and a fourth signal terminating with delay after the resepctive termination of the first and second signals;

gate means, responsive to the third and fourth signals respectively, providing the clutch current, whereby the clutch is continuously engaged during the operation of the select lever away from said positions, during said delay 2. The system according to claim 1 wherein the gate means comprises logic gates and a transistor responsive to a signal from one of the logic gates for allowing the clutch current to flow.

3. The system according to claim 2 wherein
the first driving range switch and the second driving range switch operates to produce respectively said first signal and said second signal when each respective switch is turned off.

4. The system as set forth in claim 1, wherein
said delay means comprises two inverters connected in series and a capacitor connected in parallel across one of said inverters.

5. The system as set forth in claim 1, wherein
said gate means comprises a NAND gate having one input connected to an output of delay means and another input connected to a corresponding of said driving range switches receiving a corresponding of said first and second signals.

6. The system as set forth in claim 5, wherein
said gate means comprises two of said NAND gates and said delay means comprises two delay circuits respectively operatively connected to a corresponding of said driving range switches.

7. The system as set forth in claim 6, wherein
said gate means further comprises an OR gate connected to the outputs of said NAND gates.

8. The system as set forth in claim 1, wherein
said delay means further produces said third and fourth signals respectively in response to said first and second signals.

9. A system for controling clutch current of an electromagnetic clutch which current produces engagement of the electromagnetic clutch in a vehicle having an engine, an automatic transmission with the clutch being connected between the engine and the automatic transmission, and a select lever selectively moveable to respective positions corresponding to first and second driving ranges of the automatic transmission which ranges are different in transmission performance, comprising:

a first driving range switch and a second driving range switch respectively operated only at the respective positions of the select lever corresponding to the first and second driving ranges producing first and second signals respectively;

gate means responsive to said first and second signals respectively providing the clutch current to engage the clutch;

delay means responsive, during operation of the select lever away from the respective positions of the select lever, to termination of the first and second signals respectively producing respectively, a third signal continuing for a delay time and a fourth signal continuing for a delay time after the respective termination of the first and second signals;

said gate means is further responsive to the third and fourth signals respectively providing clutch current whereby the clutch is continuously engaged during the operation of the select lever away from said positions, during said delay time.

10. The system as set forth in claim 9, wherein
said first and second driving ranges are a normal driving range and a high engine speed driving range, respectively.

11. The system as set forth in claim 9, wherein
said transmission is an infinitely variable transmission.

12. The system as set forth in claim 9, wherein
said electromagnetic clutch is a magnetic powder clutch.

13. The system as set forth in claim 9, wherein
said gate means is further responsive to absence of all said signals for disengaging the clutch in a neutral position of the select lever.

* * * * *